United States Patent [19]
Saito et al.

[11] Patent Number: 5,878,831
[45] Date of Patent: Mar. 9, 1999

[54] POWER ASSISTED MANUALLY POWERED VEHICLE

[75] Inventors: Mikio Saito; Masaki Ito, both of Iwata, Japan

[73] Assignee: Yamaha Hatsudoki Kabushiki Kaisha, Iwata, Japan

[21] Appl. No.: 610,356

[22] Filed: Mar. 4, 1996

[30] Foreign Application Priority Data

Mar. 3, 1995 [JP] Japan .................................... 7-044157

[51] Int. Cl.⁶ .................................................. B62K 11/00
[52] U.S. Cl. ......................... 180/206; 180/205; 318/139
[58] Field of Search .................................. 180/205, 206, 180/65.1, 65.2, 65.8, 220, 907, 207; 318/139, 452; 701/22

[56] References Cited

U.S. PATENT DOCUMENTS

| | | | |
|---|---|---|---|
| 3,904,947 | 9/1975 | Crews | 180/65.8 |
| 5,024,286 | 6/1991 | Lean et al. | 180/65.2 |
| 5,367,455 | 11/1994 | Kitagawa et al. | 180/65.1 |
| 5,370,200 | 12/1994 | Takata | 180/220 |
| 5,627,752 | 5/1997 | Buck et al. | 180/65.8 |
| 5,662,187 | 9/1997 | McGovern | 180/205 |

*Primary Examiner*—Daniel G. DePumpo
*Attorney, Agent, or Firm*—Knobbe, Martens, Olson & Bear LLP

[57] ABSTRACT

A number of embodiments of an electrically assisted manually powered bicycle that utilizes a control means whereby the operation of the electric power assist is curtailed when the battery voltage drops below a lower threshold value. Means are also provided to gradually reduce the electrical power assist prior to this so as to more smoothly transition to a nonpower assisted operation.

30 Claims, 10 Drawing Sheets

POWER ASSISTED MANUALLY POWERED VEHICLE

BACKGROUND OF THE INVENTION

This invention is adapted to be embodied in a primarily manually operated vehicle with a power assist and more particularly to an electrically power assisted vehicle of this type.

There has been proposed a type of vehicle that is designed to be operated primarily by the manual force of the operator or rider. However, in order to permit individuals who may have some physical disabilities or persons of lessor strength to enjoy the exercise of such vehicles, it has been proposed to provide an electric power assist for the operation of these vehicles. In addition to permitting such disadvantaged persons to utilize such vehicles, the use of the power assist permits people having normal or greater than normal abilities also to utilize the vehicle to a fuller advantage.

The electric power assist is provided by an electric motor that is powered periodically from an electric battery in response to certain control conditions so as to provide the desired power assist. Obviously, this type of vehicle is quite small and compact and, accordingly, the size of the batteries which are carried by the vehicle are limited. It is also desirable to employ batteries that are rechargeable for a wide variety of purposes.

It is known that when rechargeable batteries are employed, it is desirable to prevent total depletion of the power of the battery before it is recharged. This prevents permanent damage and/or shortened life span of the battery. Therefore, the control systems normally include a mechanism which requires the operator to charge the battery before it is fully depleted. One way in which this charging may be called for is by having the electrical circuit discontinue the supply of electric power once the battery voltage falls below a predetermined value.

However, it is also well known that most rechargeable batteries have a so called "memory". Thus, if the battery is recharged before it is depleted to a certain relatively low value but still above the value where damage may occur, then the life of the battery will gradually deteriorate. However, this memory effect becomes cumulative and results in a vicious cycle wherein the batteries must be charged more and more frequently and eventually become relatively useless because their life is so foreshortened.

There have been proposed, therefore, systems that provide an arrangement wherein the charging of the battery is not required until the voltage falls below a value which is varied in relation to certain functions. That is, a constant predetermined voltage is not set for determining the necessity for recharging. Rather, the voltage at which recharging is required is set in accordance with a variable condition.

With this type of vehicle, however, the manual power is frequently applied through a pedal mechanism. The pedal mechanism itself, because of the varying effective ratios of the crank arms, causes the operator demand to appear to vary even though the pedaling effort may be constant. Hence, even if such variable voltage levels are set, it is relatively easy to exceed them and cause the system to disable the battery and require its charging. Thus, the problem aforenoted continues to exist.

In addition to this problem, the variable voltage threshold concept can raise further problems which along with its complexity make it also undesirable to utilize in some instances. That is, when the voltage at which charging is required is varied at one or more predetermined levels, the area between those levels is constant at the lowermost value and thus the systems do not really fully perform their intended function.

It is, therefore, a principle object of this invention to provide an improved power-assisted manually power vehicle.

It is a further object of this invention to provide a battery controlled system for power assisted, manually operated vehicles wherein the recharging life of the battery may be maintained relatively constant and the battery life and recharging times extended.

It is a further object of this invention to provide an arrangement for an electric power assisted vehicle wherein the time at which the battery must be recharged is geared more closely to the actual battery condition than with certain prior art types of devices.

As has been noted, many of the types of control system employed have in essence disabled the battery from further utilization when its voltage falls below a predetermined value. Due to the very nature of the persons which are encouraged to use this type of vehicle, however, this can be undesirable. That is, if the battery condition falls below a predetermined value when the user is at a long distance from his home or a place where recharging is possible and the battery power is shut off, the individual may not be able to pedal the vehicle back to the place where it can be charged.

It is, therefore, a still further object of this invention to provide an improved battery power-assisted vehicle wherein the operator is given adequate warning of low battery level and the battery assist is not discontinued immediately so that the operator may utilize battery power assist to return to a source where the battery can be charged.

SUMMARY OF THE INVENTION

This invention is adapted to be embodied in an electrically power assisted, manually propelled vehicle. The vehicle has a manually operated propulsion device for propelling the vehicle. An electric motor is incorporated for driving the propulsion device for providing electric power assist for the vehicle. A battery is provided for supplying electrical power to the electric motor. Means are provided for sensing the voltage of the battery and means provide a signal to the operator when the battery voltage falls below a predetermined value. In addition, means are provided for precluding the transmission of electric power from the battery when the battery voltage falls below a second predetermined value which is lower than the first predetermined value. Means are provided for changing at least one of the predetermine values in response to the current flow to the electric motor during at least a portion of the range of current flow.

DETAILED DESCRIPTION OF THE PREFERRED EMBODIMENTS OF THE INVENTION

Figure 1:
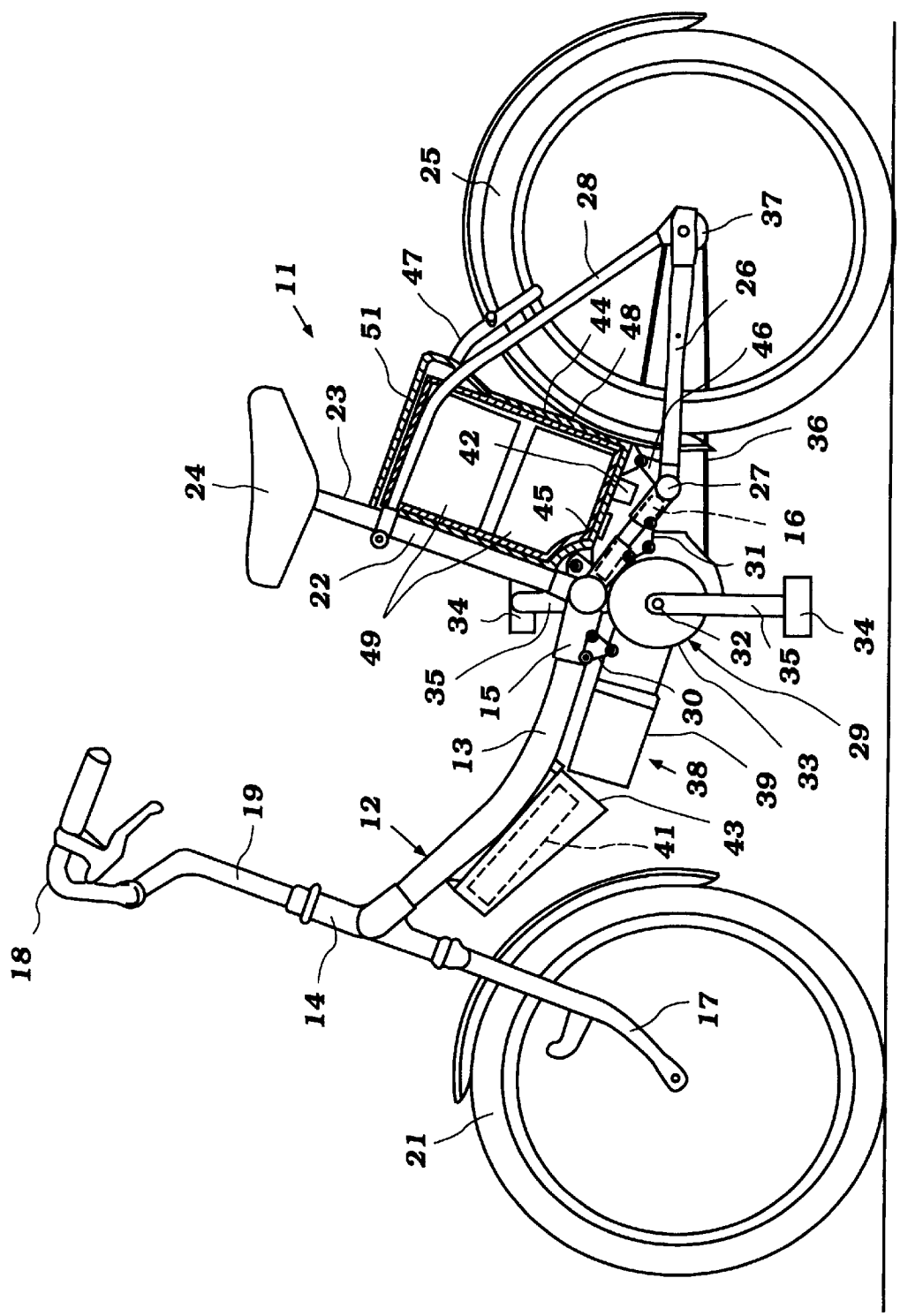
FIG. 1 is a side elevational view of an electrical power assisted bicycle constructed in accordance with an embodiment of the invention.

Referring now to the drawings and initially to FIG. 1, an electrical power assisted bicycle constructed and operated in accordance with an embodiment of the invention is indicated by the reference numeral 11. The bicycle 11 includes a frame assembly 12 consisting of a main tube 13. The main tube 13 extends forwardly and curves upwardly and is connected at its upper end to a head tube 14. The rear end of the main tube 13 is connected by means of a lug 15 to a rear tube 16 that extends generally downwardly and rearwardly.

The head tube 14 journals a front fork 17 for dirigible motion in response to the control of a handlebar 18 that is affixed to the upper end of a steering shaft 19. A front wheel 21 is rotatably journaled by the front fork 17 in a known manner.

A seat pillar that is indicated by the reference numeral 22 is affixed to the rearward portion of the frame main tube 13 by the lug 15 and extends generally upwardly and rearwardly. The seat pillar 22 telescopically receives a seat post 23 at its upper end. A seat 24 is affixed to the upper end of the seat post 23 for accommodating a rider.

A rear driven wheel 25 is rotatably journaled within the rearward ends of chain stays 26. These chain stays extend forwardly and are affixed to the rearmost end of the rear tube 16 by means of a lug 27.

Additionally, seat stays 28 are affixed to the rearward ends of the chain stays 26 and extend forwardly and upwardly for connection at their upper ends to the top of the seat pillar 22. This forms a triangular, reinforced construction.

A manually operated propulsion device is indicated by the reference numeral 29 and is carried by the lower end of the frame 12 by brackets 30 and 31 which are connected to the lugs 15 and 27, respectively. The manually operated propulsion device 29 is composed of a crankshaft 32 that is rotatably journaled within a housing 33. Pedals 34 are connected to the crankshaft 32 by means of crank arms 35. The crankshaft 32 is connected by a one-way clutch (not shown) to a sprocket (not shown) by which a rider may drive the rear driven wheel 25 through a chain 36 and sprocket 37.

An electric power assist device is provided in association with the manually operated propulsion device 29 and is indicated by the reference numeral 38. The electric power assist device 38 is connected to a transmission (not shown) so as to provide power assist to the driving of the rear driven wheel 25.

The assist device 38 consists of an electric motor 39 for driving the rear wheel 25 through another one way clutch, a controller 41 for regulating the amount of power assist provided by the motor 39, and a battery assembly 42 for powering the motor 39 and controller 41.

The electric motor 39 is affixed to the forward end of the propulsion device housing 33 by any suitable means, while the controller 41 is housed within a lower housing 43 that is affixed to the lower surface of the main tube 13 of the frame 12. The control mode for selecting when power assist will be exerted and the amount of power assist may be of any known type but will be described generally below.

The battery assembly 42 consists of a box portion 44 that is affixed to the frame 12 by means of brackets 45, 46, and 47 and in which is positioned a battery carrier 48 that contains batteries 49. The box 44 is sealed by a lid 51. Again, any known construction may be used.

The electric power assist is provided in the following manner. A torque sensor (not shown) is provided in association with the crankshaft 32 and outputs a signal to the controller 41 that is indicative of the torque input generated at the crankshaft 32 by the rider. Based on this, the controller 41 then regulates the electrical power supply to the motor 39 by the battery assembly 42 such that a large amount of electric power assist is provided when a large torque is detected by the torque sensor while electric power assist is provided in lesser degree when the sensor indicates that the rider is expending less effort in powering the bicycle 11. The power assist may also be varied with vehicle speed, if desired.

Figure 2:
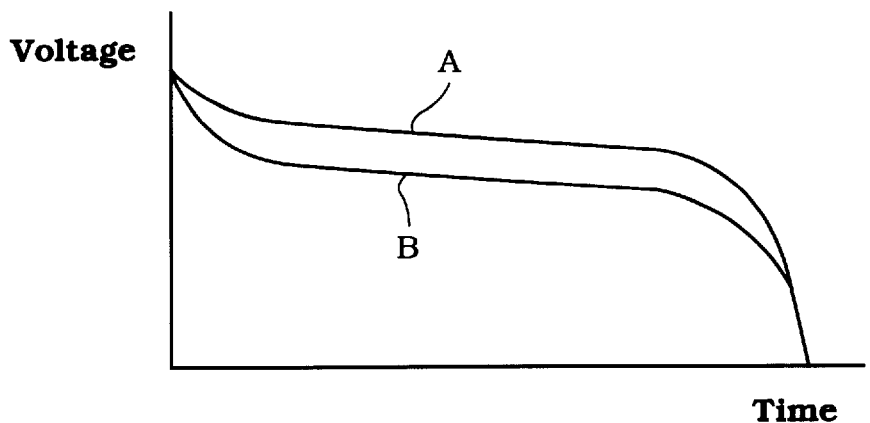
FIG. 2 is a graphical view that shows the relationship between voltage and time in use for the power supplying batteries to illustrate a principle of this invention.

FIG. 2 is a graphical view showing how the battery voltage depletes with time as it is used. The curve A shows the battery voltage for a new battery. It will be seen that the battery voltage for a new or good battery drops off at a relatively gradual rate with time of use until close to the point of discharge at which it falls off more rapidly.

It has been, as noted, the practice to provide an arrangement wherein the battery is recharged before its voltage falls below a certain predetermined value. However, the fact that the pedal mechanism including the crankshaft 32 experiences a cyclical torque even when pedaling at the same speed, creates a risk that the battery voltage may fall to the recharging level before the battery actually has depleted sufficiently so that it should be recharged.

If this recharging occurs prematurely, then the next time the battery is used the performance will deteriorate as shown by the curve B in FIG. 2. As this situation continues, the battery will eventually become useless because it must be recharged too frequently.

Figure 3:
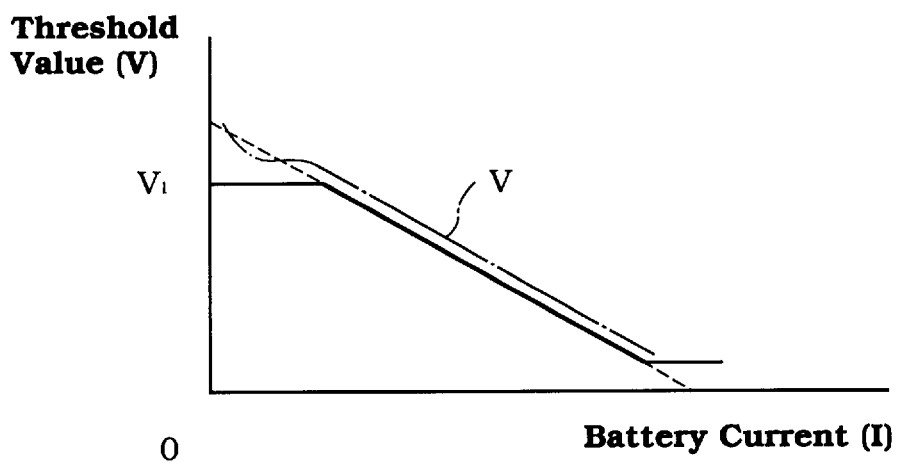
FIG. 3 is a graphical view that shows the relationship between the threshold value for the battery voltage and the battery current to further illustrate a principle of this invention.

Therefore, it may be proposed to provide a variable threshold value to set recharging as indicated by the broken line curve in FIG. 3. However, even this is not a satisfactory way to control the battery for the reason which will now be described.

As seen by the dot-dash curve, during initial start-up, there may be a high load on the battery that will cause the battery voltage to drop below the curve B. As a result, the battery may be charged too soon and the condition shown by the curve B in FIG. 2 will result.

In a similar manner, if the battery voltage is permitted to drop along the broken line curve, then at the high current values, the battery may be depleted too much and the battery will be permanently damaged.

Therefore, in accordance with a first feature of the invention, the battery charging curve is held constant at a high value under low current flows and at high current flows. Because of this, then the battery will never be charged prematurely nor will it be permitted to become so depleted that it is permanently damaged. Although flat threshold values are set at the low current and high current ends, it is possible to set a flat value at one end or the other. It is preferred, however, to set the values constant at both ends.

Even with the expedient of setting the threshold value constant at the high end or low ends of current draw, the mere shutting off of the battery on a variable slope, as shown in FIG. 3, still cannot totally solve the problem. Again, this is a problem that results from the fact that instantaneous torque settings may require a higher current flow temporarily that would cause the battery voltage to deplete. However, once this high load condition is removed, the battery will recover.

If, however, the battery is shut off and must be recharged because of the short term depletion, then the memory effect on the battery will again result. Therefore, in accordance with a further feature of the invention, there is provided a pair of thresholds indicated at $V_{th1}$ and $V_{th2}$. The higher threshold level is employed to give a warning to the operator. This warning indicates that the battery voltage has temporarily been depleted. The operator can then make a mental determination as to whether or not this is a permanent or long-term condition and can still pedal the bicycle 11 and receive power assist. However, in accordance with this embodiment, when the lower threshold value $V_{th2}$ is reached, then recharging will be demanded.

Figure 4:
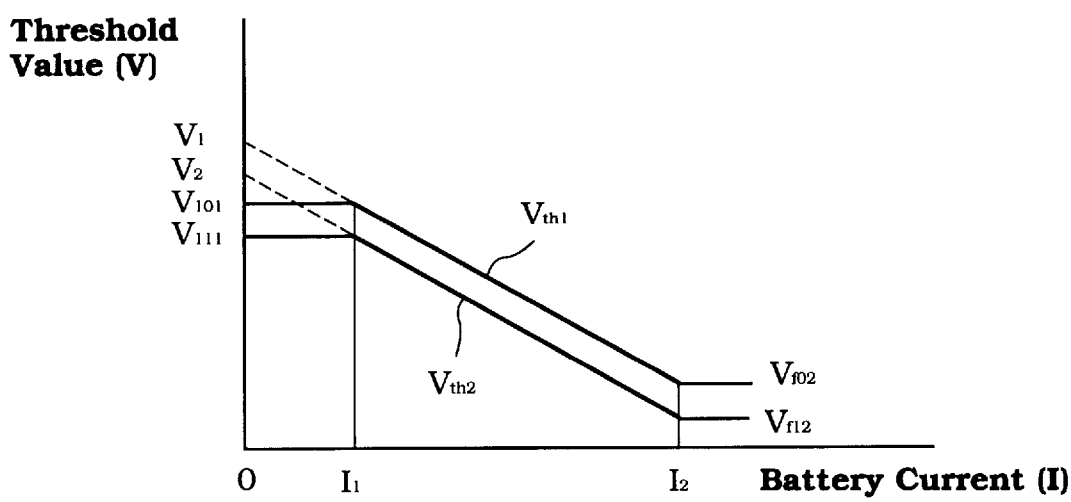
FIG. 4 is a graphical view that shows the relationship between the battery voltage threshold value for first and second threshold levels and the battery current in an embodiment of the invention.

As seen in FIG. 4, each of the curves $V_{th1}$ and $V_{th2}$ is provided with a constant initial threshold value $V_{F01}$ and $V_{F11}$, and a constant high current fixed threshold value $V_{F02}$ and $V_{F12}$ which are held constant in the range of current flows between zero and $I_1$ and over $I_2$, respectively. The structure by which this is accomplished and by which the variable threshold values $V_{th1}$ and $V_{th2}$ are determined may be understood by reference to FIG. 5 which shows the relationship between the various elements of the system. This system includes a controller 41 that will be discussed with reference to FIG. 5.

The controller consists of a torque voltage detection section 61 that receives a signal that is indicative of the rider pedal force from the aforenoted torque sensor in the manually operated propulsion device 29 through an interface 62 of the controller 41. The torque voltage detection section 61 provides its signals to an indication current calculation section 63 which determines the indication current to be used in supplying electrical power assist based on the input pedal force based on any desired control strategy. This value is output to a PWM calculation section 64 which converts the output signal from the indication current calculation section 63 to a pulse current duty ratio that is delivered to a current control section 65 of the electric power assist device 38 through a controller interface 66. The current control section 65 then regulates the current delivered from the batteries 49 to the motor 39 by varying the duty ratio through a chopper circuit.

A current sensor that is indicated by the reference numeral 67 is disposed between the batteries 49 and the current control section 65 and outputs a signal that is indicative of the current supplied to the motor 39. This value is transmitted to a current detection section 68 of the controller 41 through an interface 69.

This signal is converted to an appropriate process signal and outputted to a threshold value calculation section 70. This section calculates the appropriate threshold values $V_{th1}$ and $V_{th2}$. These values are calculated from the following equations using the internal resistance (R) of the batteries 49.

$$V_{th1}=V_1-IR \quad (1)$$

$$V_{th2}=V_2-IR \quad (2)$$

In these equations, I is the current flow sensed by the current flow meter 67. The appropriate values of $V_1$ and $V_2$ are determined experimentally for the type of batteries utilized. The value of R therefore determines the slope of the curves shown in FIG. 4 and subsequent similar curves.

If the above signal indicates a current of less than the low current limit, $I_1$, as shown in FIG. 4, then the above calculation is not made. Instead, the values $V_{f01}$ and $V_{f11}$ which are stored in memory 71 are used as the first and second predetermined threshold voltage values.

In like manner, if the current signal is equal to or greater than the high current limit, $I_2$ shown in FIG. 4, then the values $V_{f02}$ and $V_{f12}$ are used as the first and second predetermined threshold voltage values. Between the low and high current limits $I_1$ and $I_2$ the variable limits $V_{th1}$ and $V_{th2}$ are applied.

The selected and/or calculated threshold values are then output to a warning cutoff discrimination section that is indicated by the reference numeral 72.

A voltage sensor is indicated by the reference numeral 73 is disposed across the poles of the batteries 49. The voltage sensor 73 outputs a signal that is indicative of the battery voltage to a voltage detection section 74 of the controller 42 through an interface 75. This signal is also converted to an appropriate process signal that is output to the warning cutoff discrimination section 72, which then compares this battery voltage as calculated from formula 3 below to the selected first and second predetermined threshold voltage values $V_{f01}$ or $V_{f02}$, $V_{th1}$ or $V_{th2}$, $V_{f02}$ or $V_{f12}$ depending on the instantaneous current flow.

$$V=v-IR \quad (3)$$

If the battery voltage is less than the higher selected value but greater than the lowest selected value, a signal is output to an LED mounted on the handlebar 18 or at another easily viewed location, which causes the LED to blink. This indicates to a rider that the battery charge has diminished and that the batteries 49 will soon need recharging.

If, however, the battery voltage is less than or equal to the lowest selected value, the warning cutoff discrimination section 72 outputs a signal through an interface 76 to a coil (not shown) which opens a relay 77 disposed between the motor 39 and the batteries 49, thus shutting off the motor 39 and curtailing any further battery discharge.

The warning cutoff discrimination section 72 also overrides the current value based on the rider pedal force calculated by the indication current calculation section 63 to zero, which thus causes the current control section 65 to discontinue current supply to the motor. This assures that the electric power assist will be discontinued, even in the eventuality of the relay 77 sticking in the closed position. A signal is also output to the LED, which causes it to remain on, thus indicating to the rider that the electric power assist is inoperative until such time as the batteries 49 are recharged.

Figure 5:
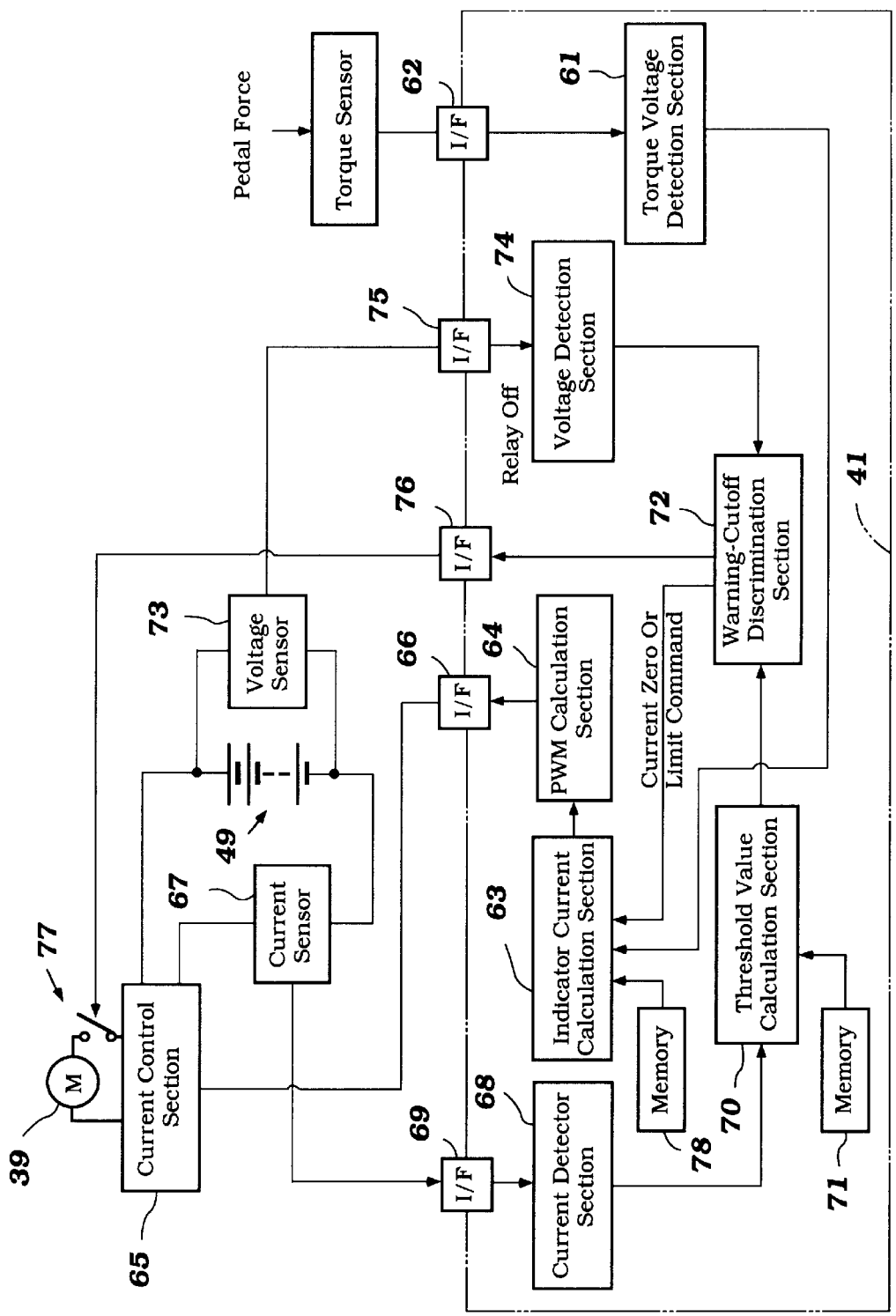
FIG. 5 is a block diagram of a control circuit that is utilized in a first embodiment of the invention.
Figure 6:
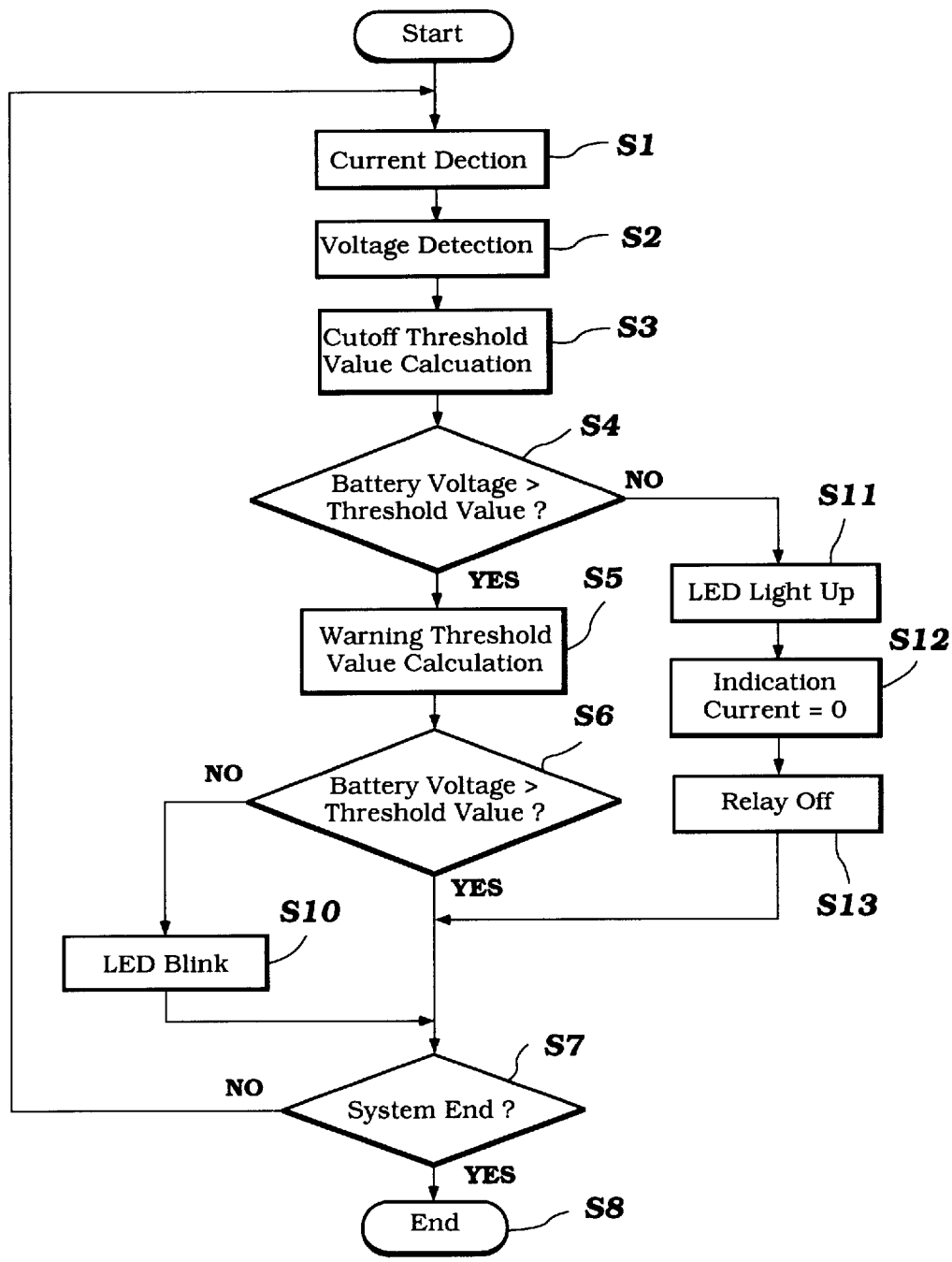
FIG. 6 is a flow chart that illustrates the control sequence for a first embodiment of the invention.

FIG. 6 further illustrates the control sequence utilized by the above control system as just described. The sequence starts and proceeds to step S1 where the battery current output to the motor 39 is detected by the current sensor 67. Following this, the battery voltage is detected by the voltage sensor 73 in step S2. The second predetermined threshold voltage value or cutoff battery voltage threshold value is calculated in step S3 based on the current detected in step S1 from the lower curve shown in FIG. 5.

The control sequence then proceeds to step S4 where the battery voltage is compared to the cutoff threshold voltage. If the battery voltage is less than the cutoff threshold voltage, the control sequence proceeds to steps S11, S12, and S13 as will be described later.

If in step S4, the battery voltage was determined to be greater than the cutoff threshold voltage, the control sequence proceeds to step S5 where the first predetermined threshold voltage value or warning threshold voltage selected from the upper curve of FIG. 5 is calculated based on the current detected in step S1.

The sequence then proceeds to step S6 where it is determined if the battery voltage is less than or greater than the selected warning threshold voltage. If the battery voltage is greater than the selected threshold voltage, the sequence proceeds to step S7 where it is determined to repeat the control sequence beginning at the step S1.

If the battery voltage in step S6 is less than the selected warning threshold voltage at the step S6, then the sequence proceeds to step S10 where the LED is blinked to inform the rider that the battery voltage is getting low. The control sequence then proceeds to step S7 and repeats.

If at the step S4 it is determined that the battery voltage is less than the selected cut off voltage, the program moves to the step S11. In step S11, the LED light is continuously activated so as to inform the rider that the cutoff threshold value has been reached. Then the program moves to the step S12 where the warning cutoff discrimination section 72 outputs an indication desired current of zero, thus causing the current control section 65 to cut off current flow from the batteries 49 to the motor 39 and thus disable the power assist.

For further assurance against battery depletion, in step S13 the warning cutoff discrimination section 72 opens the relay 77, which also serves to disable the electric power assist. The sequence then proceeds to step S7 where it is determined if the sequence should terminate or repeat. In this case the system terminates by proceeding to step S8.

When utilizing the above control sequence, it is seen that the power assist is discontinued instantly upon the battery voltage falling to cutoff threshold value. This may not always be desirable, as a rider will suddenly find it much more difficult to drive the bicycle 11 and may be at a location where it is not possible to recharge the batteries 49.

Figure 7:
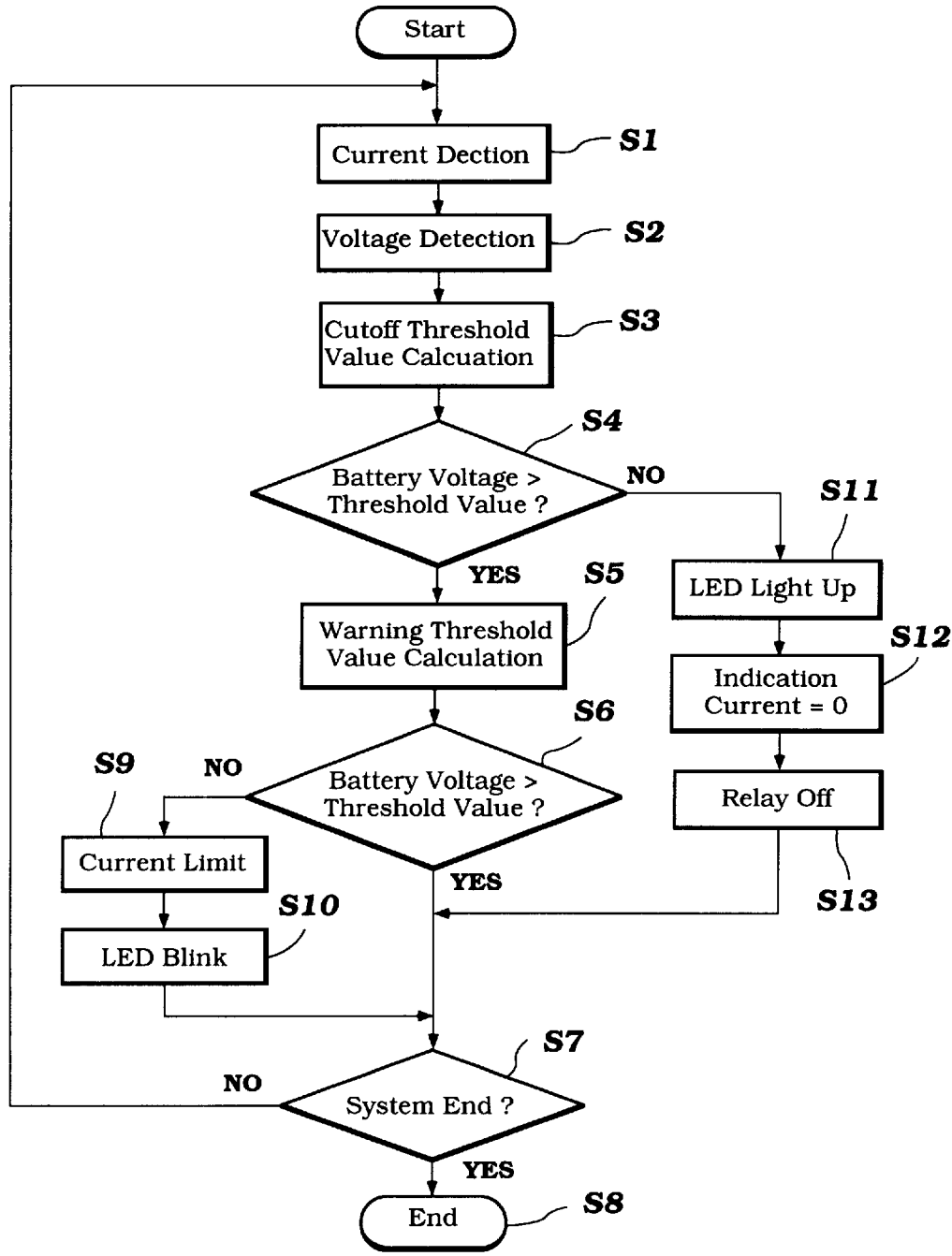
FIG. 7 is a flow chart that illustrates a control sequence for a further embodiment of the invention.

To protect against this it is therefore proposed, in accordance with another embodiment, to provide a means by which the power assist is gradually reduced to provide the rider with a more comfortable transition to nonpower-assisted bicycle operation while still providing power assist to the rider as a "limp home" type feature. This functionality is implemented in a further embodiment of control sequence that is illustrated in FIG. 7.

This control sequence is identical to the control sequence shown in FIG. 6, except an additional step S9 is executed between steps S6 and S10. This step occurs when the battery voltage, which has already been determined to be greater than the second predetermined or cutoff threshold voltage in step S4, but less than the first predetermined threshold or warning threshold voltage in step S6.

The sequence then proceeds to step S9 which limits the current supply to the electric motor by an amount stored in memory 78, as shown in FIG. 5 and performing subsequent reductions with time. The sequence next proceeds to step S10 where the LED is caused to blink and then to step S7 which will repeat the control sequence. Thus the decrease in available battery assist is done gradually and with a warning to the rider before complete battery cut off is initiated thus giving the rider advanced warning.

The reduction of battery assist may be begun at the time when the first threshold warning value is reached as is described in the embodiment described in connection with FIG. 7. It also would be possible to utilize the second, cut off threshold to trigger the gradual power reduction. This has some disadvantages, however. In that case if the operator turns off the main switch while operating in this mode and then turns the main switch on again the power reduction phase will again occur. Thus if this is done several times the batteries may be depleted to a level where they are permanently damaged. Thus the embodiment of FIG. 7 is preferred.

Figure 8:
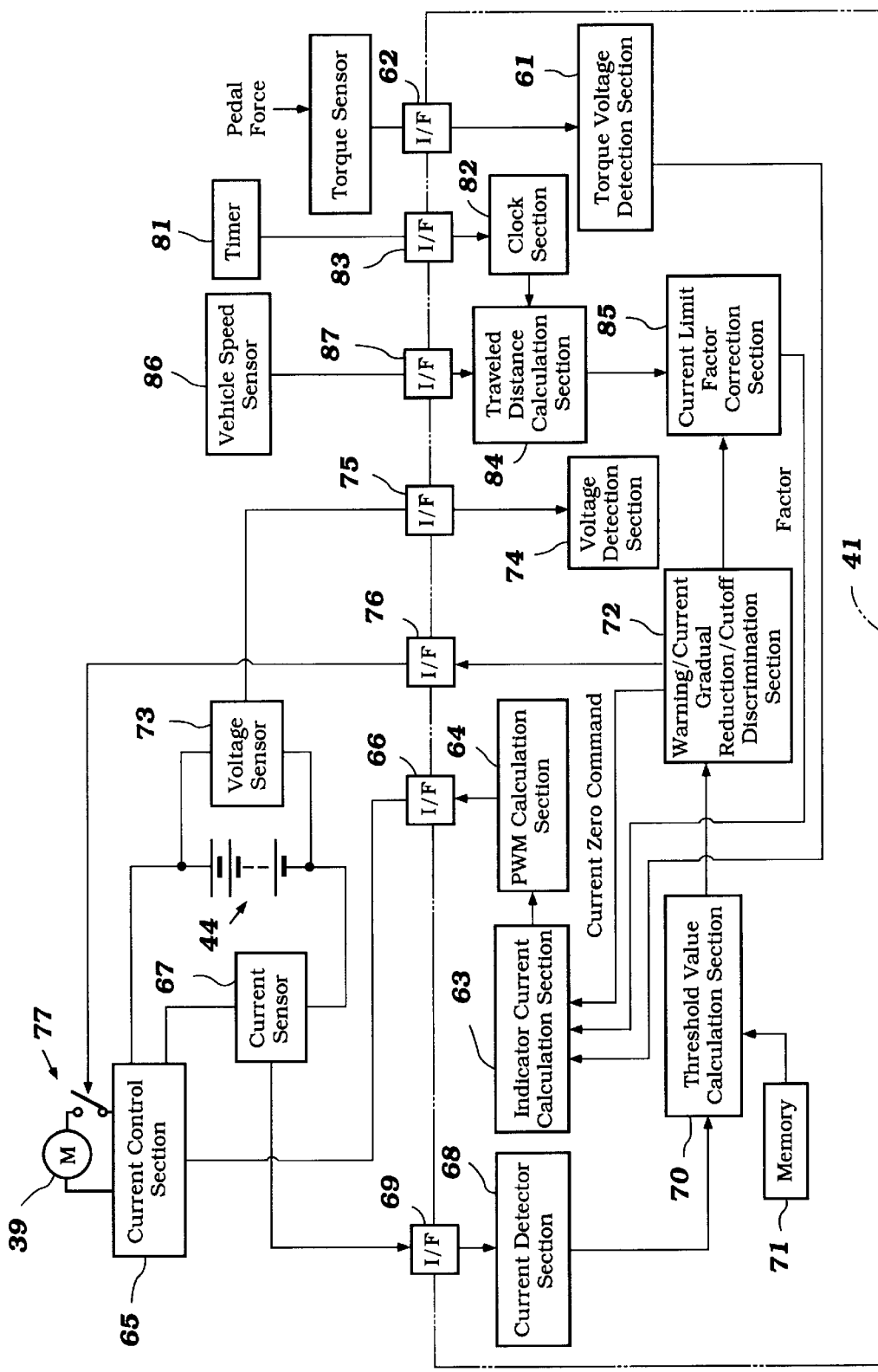
FIG. 8 is a block diagram of a control circuit that is utilized in another embodiment of the invention.
Figure 9:
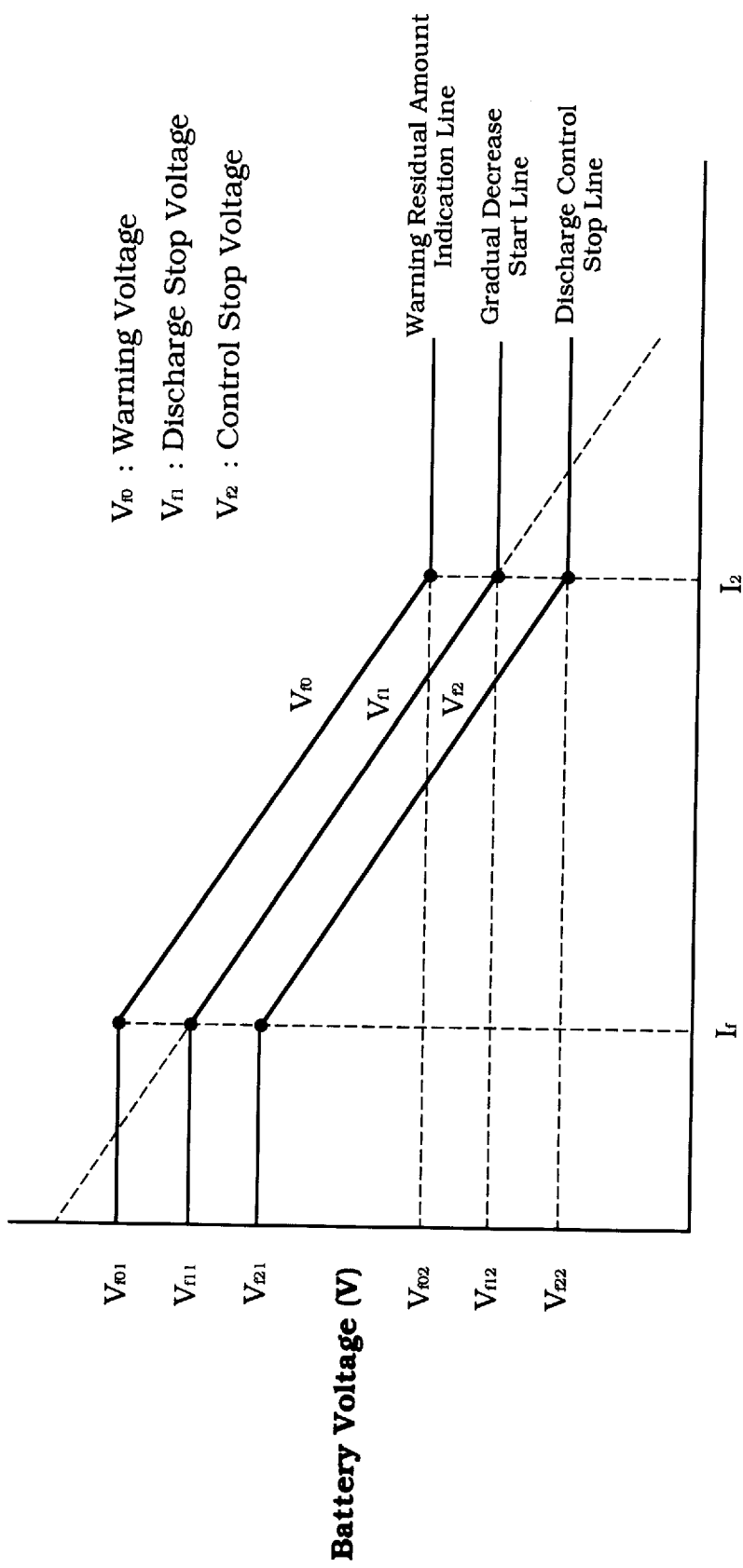
FIG. 9 is a graphical view that shows the relationship between the battery threshold voltage values and the discharge current in accordance with another embodiment.

FIG. 8 illustrates a further circuit diagram in which the means for gradually decreasing the current supply to the motor 39 is included. As seen in FIG. 9, this circuit provides for a further threshold voltage value which is the voltage at which the current limiting means begins to function. Thus, for this embodiment of the invention, the first predetermined threshold voltage value or warning threshold voltage is $V_{f0}$, while the second predetermined threshold voltage value or current limiting threshold voltage is $V_{f1}$, and the third predetermined threshold voltage value or cutoff threshold voltage is $V_{f2}$.

Referring now once again to FIG. 8, it is seen that the same components are utilized as have been previously described in the description of the circuit diagram for the first embodiment of the invention. This description will therefore be limited to those new components which are utilized in conjunction with the current limiting functionality.

A timer is indicated by the reference numeral 81 and outputs a signal indicative of the elapsed time to a clock section 82 through an interface 83. The clock section 82 converts the elapsed time signal to a suitable process signal that is output to a travel distance calculation section 84 and a current limit factor calculation section 85. A vehicle speed sensor is indicated by the reference numeral 86 and also outputs the signal indicative of the bicycle speed to the travel distance calculation section 84 through an interface 87.

The travel distance calculation section 84 calculates the distance traveled by the bicycle 11 based on vehicle speed and elapsed time and outputs this information to the current limit factor calculation section 85, which calculates the limit factor by which the assist torque is to be reduced. This limit factor is then transmitted to the indication current detection section 63 when it is determined by the warning cutoff discrimination section 72 that the second threshold voltage $V_{f1}$ has been reached. Thus, the calculated assist ratio based on pedal force is reduced by the limiting factor when the limiting current threshold voltage $V_{f1}$ is reached.

Figure 10:
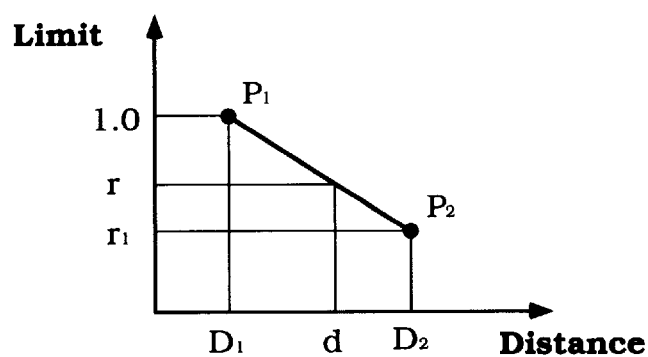
FIG. 10 is a graphical view that shows the relationship between the current limiting factor and the distance traveled in accordance with still another embodiment.

The limit factor in this embodiment is decreased linearly with the distance traveled as shown in FIG. 10. As seen in FIG. 10, the threshold voltage $V_{f1}$ is reached at a distance of D1 from the start of travel at which point the limit factor begins to decrease linearly from 1 to $r_1$ until the distance D2 is reached. Therefore the limit factor r at a given distance d may be expressed by the following equation:

$$r=1.0-(d-D_1)\times(1.0-r_1)\div(D_2-D_1)$$

The distance reduction factor may be replaced by one based on time traveled by replacing the distance factors above with time factors. Also both time and distance may be employed or whichever is greater. These methods give increased utility.

Figure 11:
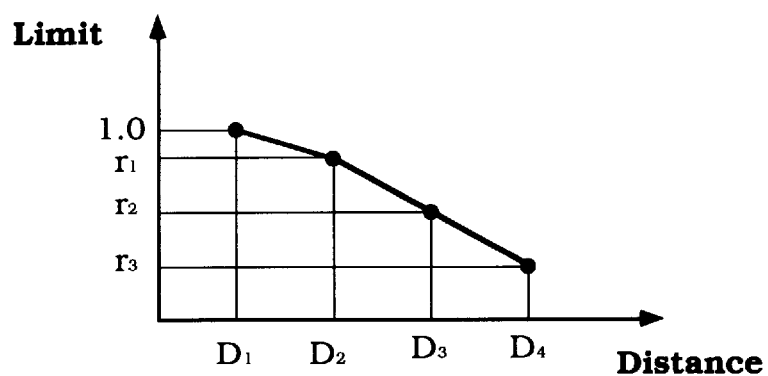
FIG. 11 is a further graphical view that is similar to FIG. 10 and shows the relationship between the current limiting factor and the distance traveled.

Rather than a linear reduction, it may be desired to transition the reduction. Such an embodiment is shown in FIG. 11. As seen in FIG. 11, the limit factor is seen to initially decrease at a more gradual rate in order to more readily transition the rider to nonpower assisted bicycle operation. It should be noted that the limit factors may be as easily based upon time traveled as distance traveled.

This embodiment does not calculate the threshold values between the current flows $I_1$ and $I_2$. Rather the values are placed into and read from a map in the memory 71.

Figure 12:
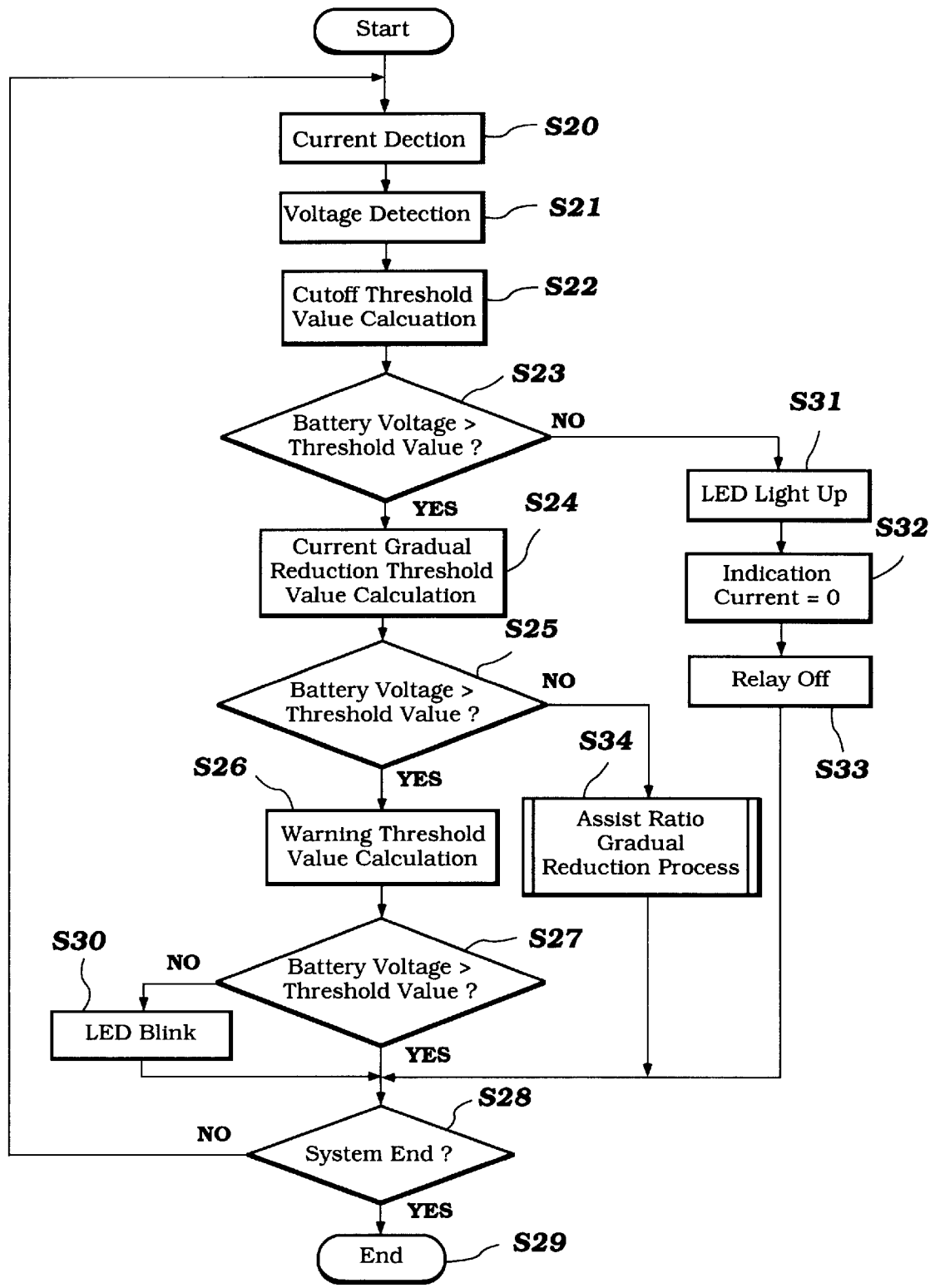
FIG. 12 is a flow chart that illustrates a further control sequence for yet another embodiment of the invention.

FIG. 12 illustrates the control sequence utilized by the above control circuit. The sequence starts and proceeds to step S20 where the battery current is detected. The battery voltage is detected in step S21, while the battery voltage cutoff threshold value $V_{f2}$ is calculated in step S22.

The control sequence then proceeds to step S23 where it is determined if the battery voltage is greater than the cutoff threshold voltage. If this is not so the control sequence proceeds to steps S31, S32 and S33 where the LED light is activated, the indication current is set to zero and the relay 77 is opened respectively. The sequence then proceeds to step S28 where it terminates.

If the battery voltage is greater than the cutoff threshold voltage, the sequence proceeds from step S23 to S24 where the gradual reduction threshold voltage $V_{f1}$ is calculated. Then in step S25 it is determined if the battery voltage is greater than the gradual reduction threshold voltage $V_{f1}$. If it is not, the sequence proceeds to the step S34 where the assist ratio gradual reduction process subsequence is initiated as will be described later.

If the battery voltage is greater than the gradual reduction threshold voltage $V_{f1}$ the control sequence proceeds to step S26 where the warning threshold voltage $V_{f0}$ is calculated. In steps S27 it is determined if the battery voltage is greater than the warning threshold voltage $V_{f0}$. If it is, the control sequence proceeds to step S28 and starts over. Otherwise, the control sequence goes to step S30 where the LED is caused to blink. The sequence then proceeds to step S28 and repeats.

Figure 13:
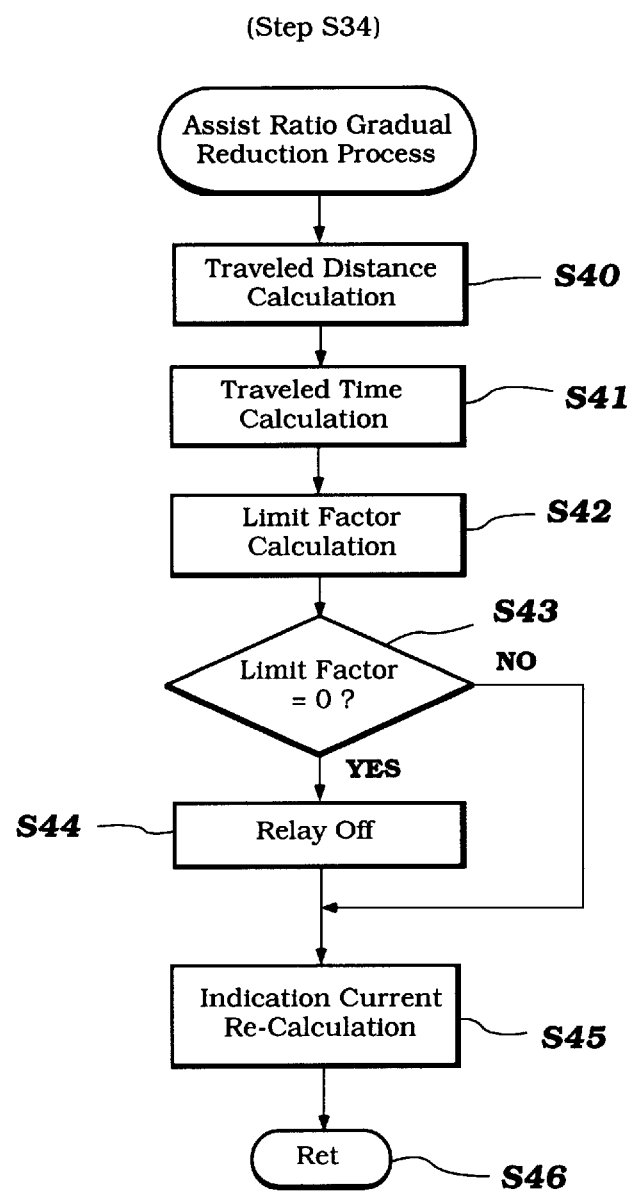
FIG. 13 is a further flow chart that illustrates a control subsequence used to determine the current limiting factor in a still further embodiment.

FIG. 13 illustrates the subsequence for the gradual reduction sequence shown as step S34 in FIG. 12 and determines the assist ratio reduction factor. The sequence begins and goes to step S40 where the distance traveled is calculated. In step S41, the elapsed time is determined, while in step S42, the current limit factor is determined based on the distance and time calculations. The subsequence then proceeds to step S43 where it is determined if the limit factor has been set to zero. If the limit factor is zero, the subsequence goes to step S44 where the relay 77 is opened and the power assist is discontinued. The subsequence then proceeds to step S45 where the indication current is recalculated based on the pedal force.

If the limit factor is not determined to be zero in step S43, the subsequence proceeds directly to step S45 and then to step S46 where the subsequence terminates.

From the foregoing, it should be readily apparent that the above described electrically power assisted bicycle provides means by which the battery power source is precluded from discharging below a desired threshold voltage level in a manner that not only avoids the memory effect but also provides advance notice to the rider of a low voltage battery condition. Of course, the foregoing description is that of a preferred embodiment of the invention and it will be readily apparent to those skilled in the art how various changes and modifications may be made from the described embodiment without departing from spirit and scope of the invention as defined by the appended claims.

What is claimed is:

1. An electric power assisted, manually propelled vehicle, said vehicle having a manually operated propulsion device for propelling said vehicle by an operator of said vehicle, an electric motor for driving said propulsion device for providing electric power assist for said vehicle, a battery for supplying electric power to said electric motor, means for sensing the voltage of said battery, means for providing a signal to the operator when said battery voltage falls below a first predetermined value, means for precluding the transmission of electrical power from said battery to said electric motor when the battery voltage falls before a second predetermined value, and means for changing at least one of said predetermined values in response to the amount of current flowing from said battery to said electric motor during at least a range of current flow when said battery is powering said electric motor to assist in the operation of said vehicle.

2. An electric power assisted, manually propelled vehicle set forth in claim 1, wherein the one predetermined value is held fixed in at least one range of operation of the vehicle.

3. An electric power assisted, manually propelled vehicle set forth in claim 2, wherein the fixed range is a low current flow range in the assist operation of the vehicle.

4. An electric power assisted, manually propelled vehicle set forth in claim 2, wherein the fixed range is a high current flow range in the assist operation of the vehicle.

5. An electric power assisted, manually propelled vehicle set forth in claim 4, wherein the one predetermined value is also held fixed at low current flows.

6. An electric power assisted, manually propelled vehicle set forth in claim 1, wherein both of the predetermined values are varied during at least respective current flow ranges therefore in the assist operation of the vehicle.

7. An electric power assisted, manually propelled vehicle set forth in claim 6, wherein both of the predetermined values have a fixed predetermined value at least certain current flows.

8. An electric power assisted, manually propelled vehicle set forth in claim 7, wherein both of the predetermined values are fixed at one end of the range of current flows.

9. An electric power assisted, manually propelled vehicle set forth in claim 8, wherein the fixed range is the low current flow range.

10. An electric power assisted, manually propelled vehicle set forth in claim 8, wherein the fixed range is a high current flow range.

11. An electric power assisted, manually propelled vehicle set forth in claim 10, wherein the one predetermined value is also held fixed at low current flows.

12. An electric power-assisted manually propelled vehicle set forth in claim 1, wherein the transmission of electric power from the battery is gradually reduced in the assist operation of the vehicle.

13. An electric power assisted, manually propelled vehicle set forth in claim 12, wherein the gradual reduction of electric power from the battery is begun at the first predetermined value.

14. An electric power assisted, manually propelled vehicle set forth in claim 13, wherein the battery current is totally shut off when the battery voltage reaches the second predetermined level.

15. An electric power assisted, manually propelled vehicle set forth in claim 12, wherein the battery current is gradually decreased at a level that is between the first and second predetermined levels.

16. An electric power assisted, manually propelled vehicle set forth in claim 12, wherein the gradual reduction of transmission of electric power from the battery begins at the second predetermined level.

17. An electric power assisted, manually propelled vehicle set forth in claim 1, wherein the manually operated propulsion device is driven by a pedal mechanism and further including a torque sensor for sensing the torque applied to the pedal mechanism.

18. An electric power assisted, manually propelled vehicle set forth in claim 17, wherein the amount of electric power assist provided is dependent upon the degree of torque sensed by the torque sensor.

19. An electric power assisted, manually propelled vehicle set forth in claim 18, wherein the transmission of electric power from the battery is gradually reduced in the assist operation of the vehicle.

20. An electric power assisted, manually propelled vehicle set forth in claim 19, wherein the gradual reduction of electric power from the battery is begun at the first predetermined value.

21. An electric power assisted, manually propelled vehicle set forth in claim 20, wherein the battery current is totally shut off when the battery voltage reaches the second predetermined level.

22. An electric power assisted, manually propelled vehicle set forth in claim 19, wherein the battery voltage is gradually decreased at a level that is between the first and second predetermined levels.

23. An electric power assisted, manually propelled vehicle set forth in claim 19, wherein the gradual reduction of transmission of electric power from the battery begins at the second predetermined level.

24. An electric power assisted, manually propelled vehicle set forth in claim 19, wherein the reduction of power is done at a rate determined by the distance traveled.

25. An electric power assisted, manually propelled vehicle set forth in claim 19, wherein the reduction of power is done at a rate determined by the time of travel.

26. An electric power assisted, manually propelled vehicle, said vehicle having a manually operated propulsion device for propelling said vehicle, an electric motor for driving said propulsion device for providing electric power assist for said vehicle, a battery for supplying electric power to said electric motor, means for sensing the voltage of said battery, means for providing a signal to the operator when said battery voltage falls below a first predetermined value, and means for changing said predetermined value in response to the current flow to said electric motor during at least a range of current flow when said battery is powering said electric motor to assist in the operation of said vehicle.

27. An electric power assisted, manually propelled vehicle set forth in claim 26, wherein the predetermined value is held fixed in at least one range of operation of the vehicle.

28. An electric power assisted, manually propelled vehicle set forth in claim 27, wherein the fixed range is the low current flow range.

29. An electric power assisted, manually propelled vehicle set forth in claim 27, wherein the fixed range is a high current flow range.

30. An electric power assisted, manually propelled vehicle set forth in claim 29, wherein the one predetermined value is also held fixed at low current flows.

* * * * *